United States Patent [19]

McCarthy

[11] Patent Number: 5,330,217
[45] Date of Patent: Jul. 19, 1994

[54] BICYCLE TRAILER AND HITCH APPARATUS

[76] Inventor: Francis D. McCarthy, 21 Curve St., Millis, Mass. 02054

[21] Appl. No.: 838,016
[22] Filed: Feb. 20, 1992
[51] Int. Cl.⁵ .......................... B62D 63/06; B60D 1/00
[52] U.S. Cl. .................................. 280/204; 280/415.1; 280/79.3; 280/47.11; 280/47.34
[58] Field of Search ....................... 280/204, 30, 415.1, 280/789, 785, 47.11, 47.34, 79.3; 296/205

[56] References Cited

U.S. PATENT DOCUMENTS

| | | |
|---|---|---|
| 2,468,894 | 5/1949 | Peek .................................. 280/514 |
| 2,882,032 | 4/1959 | Garner .......................... 280/79.3 X |
| 3,231,121 | 1/1966 | Powell ............................ 280/789 X |
| 3,598,426 | 8/1971 | Spiese ................................ 280/204 |
| 3,747,955 | 7/1973 | MacAlpine ........................ 280/204 |
| 3,848,890 | 11/1974 | MacAlpine ........................ 280/204 |
| 3,920,259 | 11/1975 | Graham ........................... 280/47.34 |
| 3,993,321 | 11/1976 | Cote .................................. 280/204 |
| 4,063,749 | 12/1977 | Tracy et al. ..................... 280/423 R |
| 4,176,853 | 12/1979 | Brock ............................. 280/423 R |
| 4,180,279 | 12/1979 | Belliveau, Sr. ..................... 280/204 |
| 4,274,649 | 6/1981 | Vanderhorst et al. ............... 280/204 |
| 4,381,117 | 4/1983 | French et al. ....................... 280/204 |
| 4,413,835 | 11/1983 | Hazelett ............................ 280/204 |
| 4,427,379 | 1/1984 | Duran et al. .................... 280/79.3 X |
| 4,753,450 | 6/1988 | Wibben ........................... 280/415.1 |
| 4,756,541 | 7/1988 | Albitre ............................... 280/204 |
| 4,928,985 | 5/1990 | Nowlin ............................... 280/204 |
| 5,076,600 | 12/1991 | Fake ................................... 280/204 |
| 5,088,751 | 2/1992 | Zint .................................. 280/47.34 |

FOREIGN PATENT DOCUMENTS

| | | |
|---|---|---|
| 0108185 | 3/1943 | Fed. Rep. of Germany ...... 280/204 |
| 0068041 | 7/1944 | Fed. Rep. of Germany ...... 280/204 |
| 0026597 | 10/1956 | Fed. Rep. of Germany ...... 280/204 |
| 0438770 | 5/1949 | Italy ................................. 280/47.11 |
| 0656227 | 9/1963 | Italy ................................. 280/47.11 |
| 0193204 | 12/1937 | Switzerland ....................... 280/204 |
| 0345214 | 3/1931 | United Kingdom ............... 280/204 |
| 0619833 | 3/1949 | United Kingdom ............... 280/204 |

Primary Examiner—Margaret A. Focarino
Assistant Examiner—Peter C. English
Attorney, Agent, or Firm—Kriegsman & Kriegsman

[57] ABSTRACT

A trailer and hitch apparatus for a bicycle includes a trailer assembly and a hitch assembly. The trailer assembly includes a front section, an extension section which is removably attached to the front section, a first trailer module which is removably attached to the extension module and a second trailer module which is removably attached to the first trailer module. The hitch assembly includes a horizontal frame having a front end adapted to be removably attached to the rear wheel fork of the bicycle near the top end. The hitch assembly also includes a pair of legs which extend downwardly from the rear end of the horizontal frame and which are adapted to be removably attached to the rear wheel fork of the bicycle near the bottom. The front section of the trailer assembly is removably attached to the rear end of the horizontal frame through a coupling, the coupling having a sleeve which is integrally formed on the front section of the trailer assembly and a pipe which is rotatably disposed inside the sleeve and which is removably mounted on the rear end of the frame of the hitch assembly. An attachment is also disclosed which can be connected to the trailer assembly to form a cart having a handle.

8 Claims, 8 Drawing Sheets

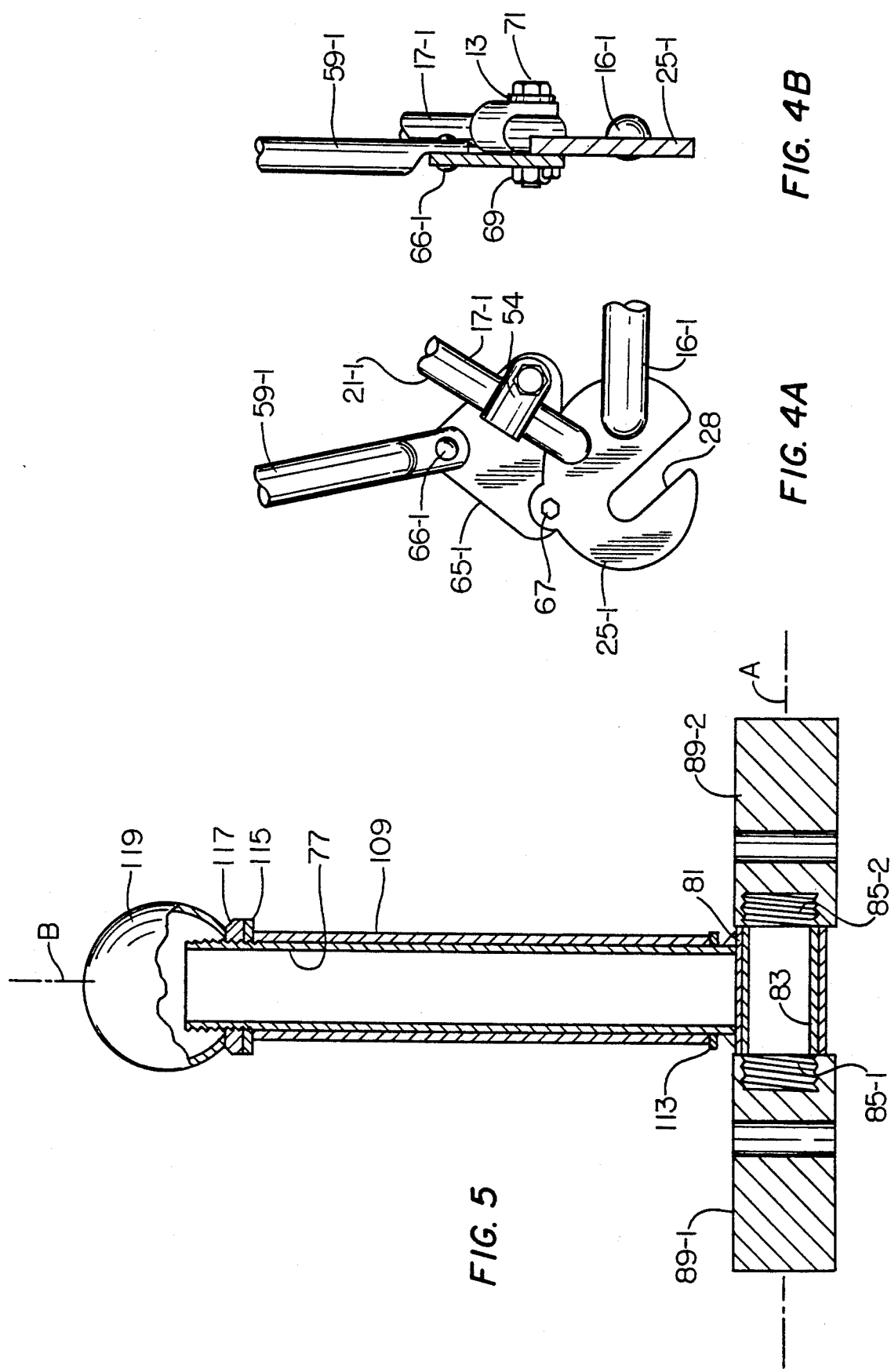

BICYCLE TRAILER AND HITCH APPARATUS

BACKGROUND OF THE INVENTION

The present invention relates to a novel bicycle trailer and hitch apparatus.

In U.S. Pat. No. 4,928,985 issued May 29, 1990 in the name of Nowlin, a bicycle buggy apparatus is set forth including a conventional bicycle provided with a seat and downwardly extending seat stud received within the framework of the bicycle. A sleeve is pivotally mounted about the seat stud and includes a rearwardly extending connecting shaft removably secured to an "S" shaped coupling shaft secured to a buggy formed with a seat, spaced parallel sides, an underlying floor, and a mount rigidly secured to a forwardmost edge of the floor connected to the aforenoted coupling shaft.

In U.S. Pat. No. 4,756,541 issued Jul. 12, 1988 in the name of Albitre, a lightweight single wheel trailer for towing behind a bicycle is described. The trailer includes an upwardly opening wire mesh-type receptacle mounted forward of the rear wheel of the trailer. The rear end of the trailer Includes opposite side rearwardly projecting arms between whose rear ends the rear wheel of the trailer is journalled and an upright standard is disposed to the rear of the receptacle and Includes opposite side inclined braces extending between the upper end of the standard and the rear ends of the wheel journalling arms. The forward end of the trailer includes an upstanding gooseneck tongue and the receptacle constitutes bracing between the upper end of the standard and at least a midheight portion of the tongue. Further, the forward end of the tongue Includes a hitch assembly for coupling the forward end of the tongue to the upstanding seat supporting shank of an associated bicycle.

In U.S. Pat. No. 4,413,835 issued Nov. 8, 1983 in the name of Hazelett, a hitch for one-wheel cycle trailers is described. The hitch, which is to be used in conjunction with a cycle trailer having a frame the front reach of which consists of round tubing or bar, is a universal-joint hitch consisting essentially of two diametrically opposed sector bearings which are constrained to bear upon the aforesaid tubing or bar of the frame from opposite directions by suitable clamping and mounting arrangements which include thrust surfaces integral to the sector bearings.

In U.S. Pat. No. 4,381,117 issued Apr. 26, 1983 in the names of French et al., a connector device for connecting and towing a wheeled cart to and by a bicycle, having an elongated shaft Including an aligned bolt with a head and having a front longitudinally aligned socket is described. A pivot ball is secured to the towing bicycle and is adapted to be removably held In the socket of the device. A slidable sleeve is provided on the shaft over the socket extension of the device for so removably holding the ball in the socket in one slidable position thereof on the shaft. A removable spring sleeve holding clamp on the shaft is also provided. A rotatable slidable collar extends over the shaft extension. A coil extension spring on the bolt portion of the shaft, between the bolt head and said collar, is provided with said slidable rotatable collar being adapted to have the towed cart tongue secured thereto. Said connecting device permits a rotation of either the bolt or said collar of the device, with relation to each other upon bicycle torque pulling of the towed cart, on device connection use.

In U.S. Pat. No. 4,274,649 issued Jun. 23, 1981 in the names of Vanderhorst et al., there is described a quick release trailer and hitch apparatus having a container mounted on a pair of wheels with a pair of pull bars attached for being adjacent to the outer front corner regions of the container. The pull bars are arranged gradually and continuously together with their remote ends attached to a connecting member. The connecting member has a center gripping portion and a rigid attachment portion with an orifice therethrough. A swivel member, permanently coupled on a ball member and freely rotatable thereabout, has a hitch portion with a first passageway for receiving the rigid attachment portion and a second passageway intersecting the first passageway. A spring loaded pin is provided to extend through the second passageway and the orifice in the rigid attachment portion to hold the swivel member and the connecting member immovable relative to each other. The ball member is attached to the bicycle in any appropriate way, such as with a bracket.

In U.S. Pat. No. 4,176,853 issued Dec. 4, 1979 in the name of Brock, there is described a quick disconnect trailer hitch for connecting a trailer vehicle to a tractor vehicle wherein a pair of pivotally connected jaws are slidably mounted in a vertically disposed tube connected to the trailer vehicle draw bar. A spring is mounted in the tube for biasing the outer ends of the jaws outwardly therefrom to an open position, the jaws being slidable inwardly of the tube to a closed position wherein the outer ends of the jaws surround a ball hitching element connected to the tractor vehicle, the spring biased jaws being latched in the closed position.

In U.S. Pat. No. 4,063,749 issued Dec. 20, 1977 in the names of Tracy et al., there is described a trailer hitch designed particularly for converting pleasure type automobiles into towing vehicles and for trailers having a gooseneck forwardly projecting front end. A principal object of the trailer hitch is to minimize fishtailing of the coupled units and to improve handling of the towing vehicle and also to provide a hitch configured for use on different models of cars with minimum difficulty in adaptation, the hitch being largely hidden in the luggage compartment.

In U.S. Pat. No. 3,993,321 issued Nov. 23, 1976 in the name of Cote, an attachment for a bicycle serving as a hitch for towing a small trailer or coaster is described. The bicycle hitch can be attached to any standard bicycle without modifying the same and is adjustable to suit bicycles of various wheel diameters. The bicycle hitch includes a curved tubular member subtending substantially a quarter circle, adapted to spacedly surround the top back quarter portion of the rear driving wheel of a bicycle in the plane of said rear wheel and substantially coaxial therewith. This curved member is adjustably attached to the bicycle frame or to the seat support rod at its front end, while its rear end carries a standard ball member for hitching purposes. The curved member is further secured to the rear wheel axle of the bicycle by means of a pair of U-shaped fork members having a series of apertures at the outer ends of their legs to adjustably receive the protruding ends of the bicycle wheel rear axle, while the bight portion of each fork member is provided with a clamping member adjustably securable to the curved member along the length of the latter.

In U.S. Pat. No. 3,848,890 issued Nov. 19, 1974 in the name of MacAlpine, there is described a coupling for connecting the drawbar of a tandem trailer to the seat post of a bicycle frame. The coupling comprises a clamp for clamping engagement with the seat post, a link rotatably connected to the clamp for rotation about a substantially horizontal axis perpendicular to the axis of the seat post, a post fixed to the other end of the link on which the loop at the end of the drawbar is adapted to be pivotally mounted, a jaw pivotally mounted on the link adjacent the post having a hook at its end for engagement with the inside of the loop and a hole for engagement with the post, and a latch plate mounted on the jaw for releasably holding the hook engaged with the inner side of the loop and the hole engaged on the post.

In U.S. Pat. No. 3,747,955 issued Jul. 24, 1973 in the name of MacAlpine, a tandem trailer designed to be detachably attached to a bicycle is described. The trailer comprises a frame provided with upper and lower horizontal frame members joined by a vertical frame member such that wheels mounted on the lower frame member support the upper frame member in a substantially horizontal position above the rear wheel of a bicycle so that the bicycle and frame are free to turn relative to each other, the upper frame member having a loop adapted to be placed about the seat ahead of the seat post, a fixed pivot pin mounted on the top bar of the bicycle frame forwardly of the seat post on which the loop is adapted to be pivotally impaled, and spring-biased clips adapted to releasably hold the loop on the pin.

In U.S. Pat. No. 3,598,426 issued Aug. 10, 1971 in the name of Spiese, a hitch particularly adapted to fit a motorcycle or other sport vehicle with rear mounted shock absorbers is disclosed. A U-shaped frame extends forwardly along the sides of the rear wheel and is connected at the lower mount of the shock absorber. Forwardly and upwardly extending braces are connected to the top mounts for the shock absorber, shock loads from the trailer being thereby transmitted to the shock absorber of the vehicle for dissipation. The braces have an obtuse angle at a midpoint to avoid interference with the exterior of the shock absorbers, and adjustment of the frame and the braces at two points allows adaptation to different vehicles.

In U.S. Pat. No. 2,468,894 issued May 3, 1949 in the name of W. R. Peek, a bicycle trailer is described comprising a handle, a sleeve adjustably journalled on the seat post of a bicycle, a bar connected at one end to said sleeve, a second named sleeve secured to said bar and having a slotted closed end means carried by the bicycle frame supporting said bar In horizontal position, the outer end of said trailer handle being curved upwardly above the bicycle, a flat vertical coupling pin pivotally connected to the front end of the handle, said coupling having its lower side edges notched for guided pivotal engagement of the side edges of the slot in the second named sleeve.

SUMMARY OF THE INVENTION

It is an object of the present invention to provide a novel bicycle trailer and hitch apparatus.

It is another object of the present invention to provide a bicycle trailer and hitch apparatus which includes a hitch assembly which can be easily secured to a bicycle and a trailer assembly which can be easily attached to and detached from the hitch assembly.

It is yet another object of the present invention to provide a bicycle trailer and hitch apparatus which is sturdy in construction.

It is still another object of the present invention to provide a bicycle trailer and hitch apparatus which Includes a trailer assembly which is not inclined to tip over Independently of the bicycle to which it is attached.

It is still yet another object of the present Invention to provide a bicycle trailer and hitch apparatus which can be used with a variety of different sized bicycles.

It is another object of this invention to provide a bicycle trailer and hitch apparatus which includes a trailer assembly which is modular in construction.

It is a further object of this Invention to provide a bicycle trailer and hitch apparatus which distributes the tongue weight of the trailer evenly over the rear wheel of a bicycle to which it may be attached.

It is still a further object of this invention to provide a hitch assembly for a bicycle which can also be used as a luggage rack.

It is yet still a further object of this invention to provide a bicycle trailer and hitch apparatus which allows for easy movement of the trailer assembly relative to the hitch assembly about a vertical axis and about a horizontal lateral axis but does not allow relative movement about a horizontal longitudinal axis.

It is another object of this invention to provide a trailer assembly which can be easily attached to a hitch assembly and which can also be easily coupled to an attachment so as to form a cart.

Additional objects as well as features and advantages of the present invention will be set forth in part in the description which follows, and in part will be obvious from the description or may be learned by practice of the invention. The objects, features, and advantages of the present invention may be realized and attained by means of the instrumentalities and combinations particularly pointed out in the appended claims.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In these drawings wherein like reference numerals represent like parts:

FIGS. 4(A) and 4(B) are front and side views respectively, showing how the mounting plate at the bottom of one of the support legs in the hitch assembly is attached to the body of the bicycle;

FIG. 5 is a section view of the coupling mechanism shown the apparatus in FIG. 1 for attaching the trailer assembly to the hitch assembly, some of the attaching hardware being omitted for convenience;

DETAILED DESCRIPTION OF PREFERRED EMBODIMENTS

Figure 1:
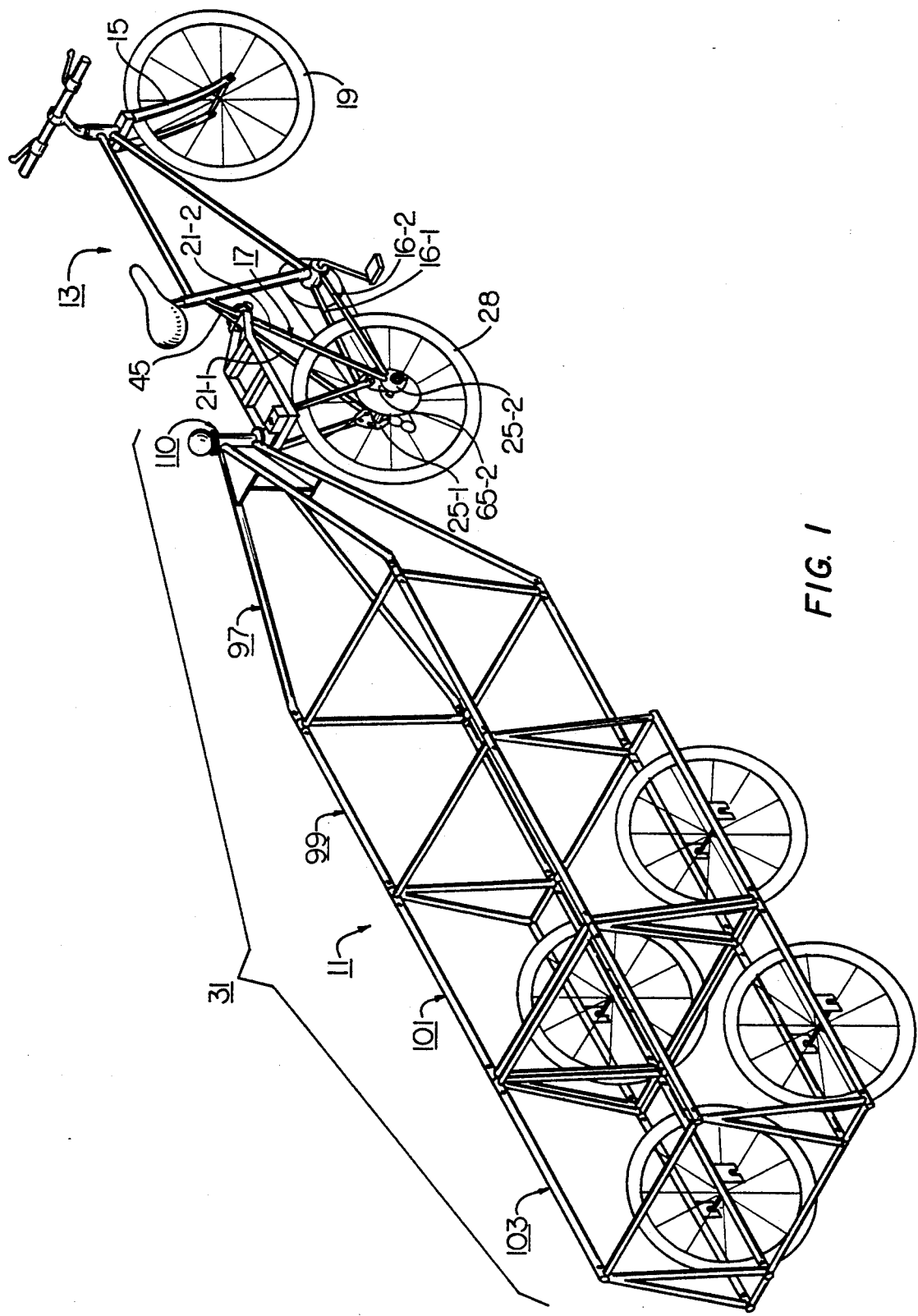
FIG. 1 is a perspective view of one embodiment of a bicycle trailer and hitch apparatus constructed according to the teachings of the present invention, the bicycle trailer and hitch apparatus being shown attached to a bicycle.
Figure 2:
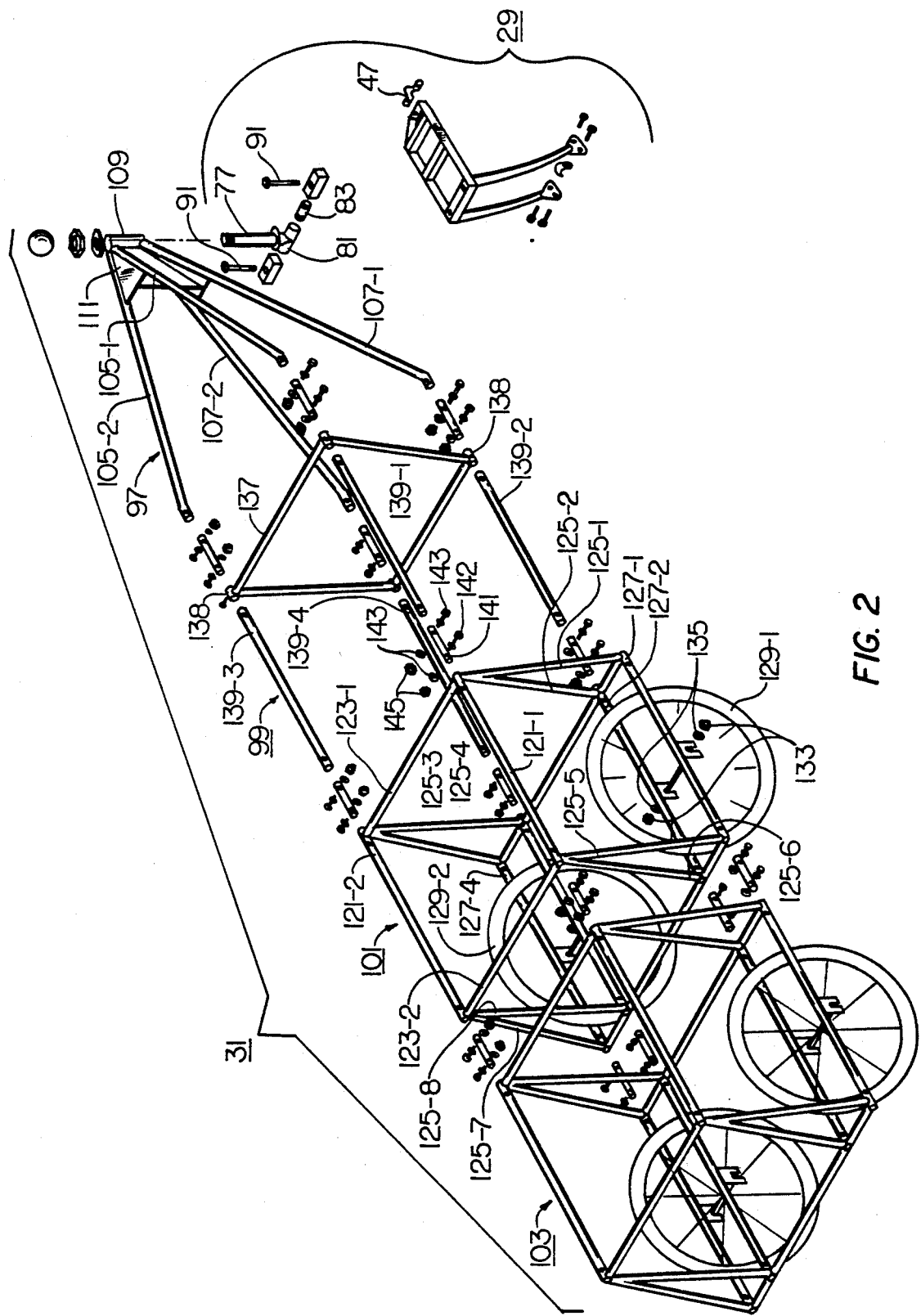
FIG. 2 is an exploded perspective view of the trailer and hitch apparatus shown in FIG. 1.

Referring now to the drawings and first to FIGS. 1 and 2, there is shown one embodiment of a bicycle trailer and hitch apparatus constructed according to the teachings of the present invention and represented generally by reference numeral 11, the bicycle trailer and hitch apparatus 11 being shown in FIG. 1 attached to a bicycle 13 and being shown in FIG. 2 by itself and exploded.

Bicycle 13, comprises a body which includes a front wheel fork 15, a pair of horizontal connecting tubes 16-1 and 16-2 and a rear wheel fork 17. A front wheel 19 is rotatably mounted on front wheel fork 15. Rear wheel fork 17 includes a pair of legs 21-1 and 21-2. A pair of rear wheel mounting plates 25-1 and 25-2, see also FIG. 4, are welded to the bottom ends of legs 21 of rear wheel fork 17, one on each leg, and are also welded to connecting tubes 16-1 and 16-2, one on each tube. A rear wheel 27 is rotatably mounted in a slot 28 formed in each mounting plate 25. Instead of being separate members fixedly mounted on each leg, each plate 25 can be integrally formed on its associated leg 21 and can also be integral with its associated tube 16. Portions of bicycle 13 not pertinent to the present invention are not shown and/or are not discussed herein.

Bicycle trailer and hitch apparatus 11 comprises a hitch assembly 29 which is removably mounted on the rear of bicycle 13 and a trailer assembly 31 which is detachably coupled to hitch assembly 29.

Figure 3:
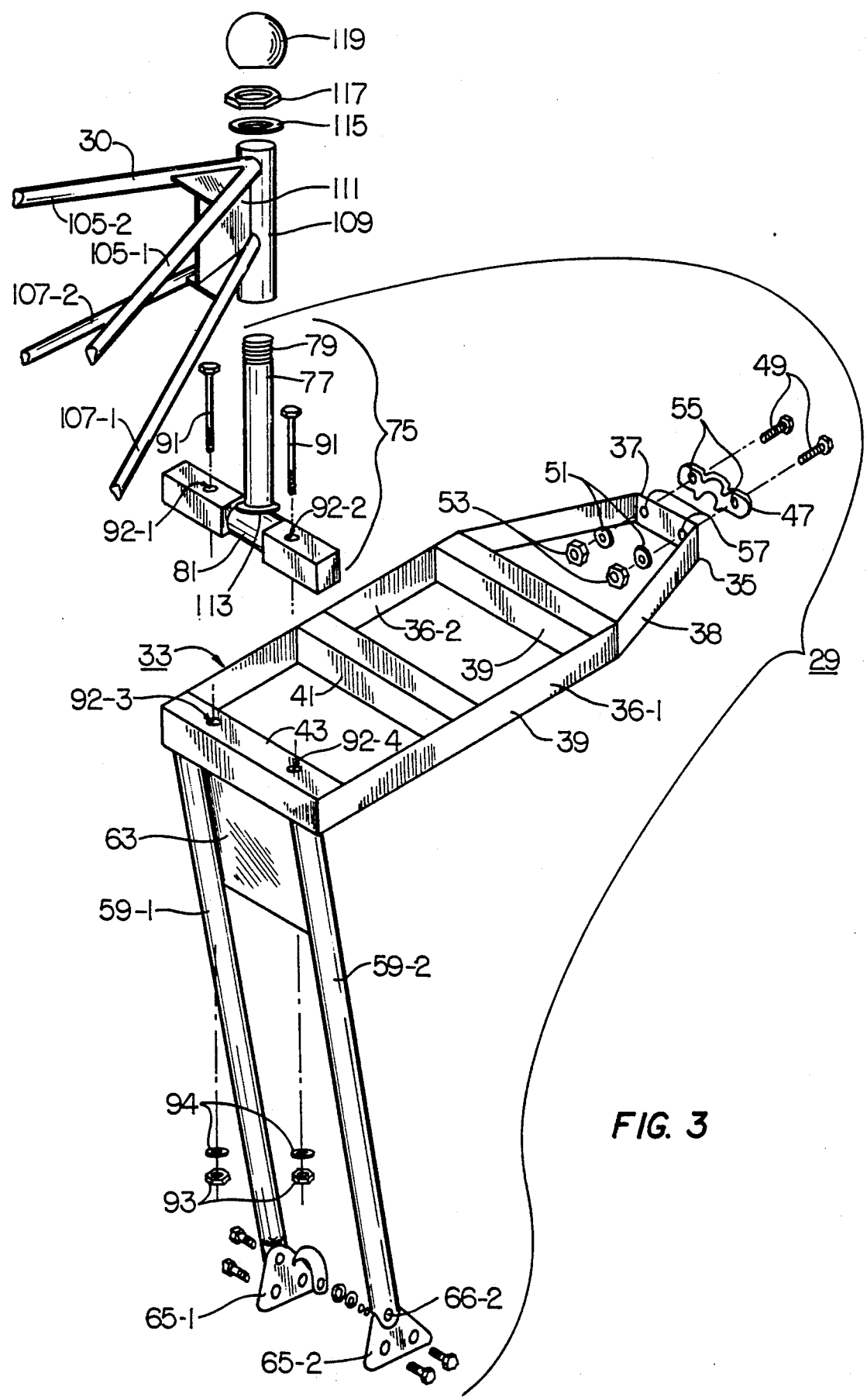
FIG. 3 is an enlarged exploded perspective view of the hitch assembly shown in FIG. 2 and the front end of the trailer assembly shown In FIG. 2.

Referring now also to FIG. 3, the hitch assembly 29 and the front end 30 of the trailer assembly 31 are shown in more detail.

As can be seen, hitch assembly 29 includes an elongated horizontal frame 33. Frame 33 includes a generally U shaped outer member 35 having a left side 36-1, a right side 36-2 and is preferably made out of strong, durable materials, such as the types of metals typically used in the construction of bicycle frames. Frame 33 also includes three transverse square stock members 39, 41 and 43 which are welded to outer member 35, stock member 43 being at the rear end of frame 33. Front end 37 is removably mounted on rear wheel fork 17 near the top end 45 by means of a bracket 47, a pair of bolts 49, a pair of washers 51 and a pair of nuts 53, the bolts 49 extending through a pair of holes 55 formed in bracket 47 and a pair of holes 57 formed in front end 37. Bracket 47 has one recess 47-1 on one side and a pair of recesses 47-2 and 47-3 on the other side so that it will fit over a pair of legs when positioned one way and will fit over a pair of legs when turned over 180 degrees.

Hitch assembly 29 also includes a pair of support legs 59-1 and 59-2 which extend downward from stock member 43. Legs 59 are fixedly secured to stock member 43 by welding or other equivalent means. A stabilizing plate 63 is secured such as by welding to legs 59. Hitch assembly mounting plates 65-1 and 65-2 are pivotally attached by pivot pins 66-1 and 66-2 to the bottom ends of each legs 59, one plate on each leg, through pivot pins 67 (see also FIGS. 4A and 4B).

Mounting plate 65-1 is attached to rear wheel mounting plate 25-1 by a bolt 67 which extends through a tapped hole in plate 25-1 and a threaded hole in plate 65-1. Plate 65-1 is also secured to leg 21-1 of rear wheel fork 17 by a horseshoe clip 54 which is welded at one end to plate 65-1, wraps around leg 21-1 and is held in place by a nut 69, a bolt 71 and a lock washer 73. Mounting plate 65-2 is secured to plate 25-2 and leg 21-2 in a similar manner.

As can be seen, mounting plates 65 are not mounted on the axle of the rear wheel 27. Thus, rear wheel 27 can be removed from bicycle 13 for repair without having to remove hitch assembly 29.

As can also be seen, frame 33, as mounted on bicycle 13, can also be used as a luggage rack.

Hitch assembly 29 also includes a pipe assembly 75 which is removably mounted on horizontal stock member 43. Pipe assembly 75 includes an upwardly extending pipe 77 externally threaded at its top end 79 and fixed such as by welding at its bottom end to a horizontal sleeve 81, see also FIG. 5. Sleeve 81 is rotably mounted on a horizontal tube 83 which is externally threaded at each end 85-1 and 85-2. End 85-1 is screwed into a suitably threaded hole in the inner end of a block 89-1 while end 85-2 is screwed into a suitably threaded hole in the inner end of a block 89-2. Pipe assembly 75 is attached to block 44-3 by a pair of bolts 91 which extend through holes 92-1 and 92-2 formed in blocks 89 and holes 92-3 and 92-4 formed in block 44-3 and which are secured in place by nuts 93 and washers 95.

Hitch assembly 29 can be removed from bicycle 13 by simply removing pairs of bolts 49, 67, 91 and 71.

Trailer assembly 31 includes a front section 97, an extension section 99, a first trailer module 101 and a second trailer module 103.

Front section 97 which serves to attach trailer assembly 31 to hitch assembly 29 includes a pair of upper rails 105-1 and 105-2 and a pair of lower rails 107-1 and 107-2, all of which are secured by welding to a vertical sleeve 109. A support bracket 111 is secured by welding to rails 105 and 109 and to sleeve 109. Sleeve 109 is rotably mounted on pipe 77 in hitch assembly 29, see also FIG. 5. A flange 113 integrally formed on pipe 77 near the bottom limits downward movement of sleeve 109 on pipe 77. Sleeve 109 is held in place on pipe 77 by a washer, 115, nut 117 and internally threaded knob-like internally threaded handle 119.

As can be seen, pipe 77 can rotate back and forth about the longitudinal axis A of tube 83 and sleeve 109 can rotate about the longitudinal axis B of pipe 77.

Pipe assembly 75 along with sleeve 109 and its associated hardware 115, 117 and 119 constitute a coupling 110 for attaching trailer assembly 31 to hitch assembly 29.

First trailer module 101 includes a frame having upper carriage rails 121-1 and 121-2, upper spreader rails 123-1 and 123-2, vertical support legs 125-1 through 125-8, lower carriage rails 127-1 through 127-4 and lower spreader rails 128-1 and 128-2 all welded together to form a box-like frame as shown. Trailer module 107 also includes a pair of wheels 129-1 and 129-2 which are mounted on wheel mounting plates 131 and secured in place by nuts 133 and washers 135. Some of which are not shown for simplicity. The spreader rails are sized to that wheels 129 are spaced apart about 24 inches.

Trailer module 101 is removably attached to front section 97 through extension section 99.

Extension section 99 which serves to increase the size of trailer assembly 31 includes a four-sided spreader frame 137 having integrally formed sleeves 138 at its four corners and a set of four extension rails 139-1 through 139-4.

Figure 6:
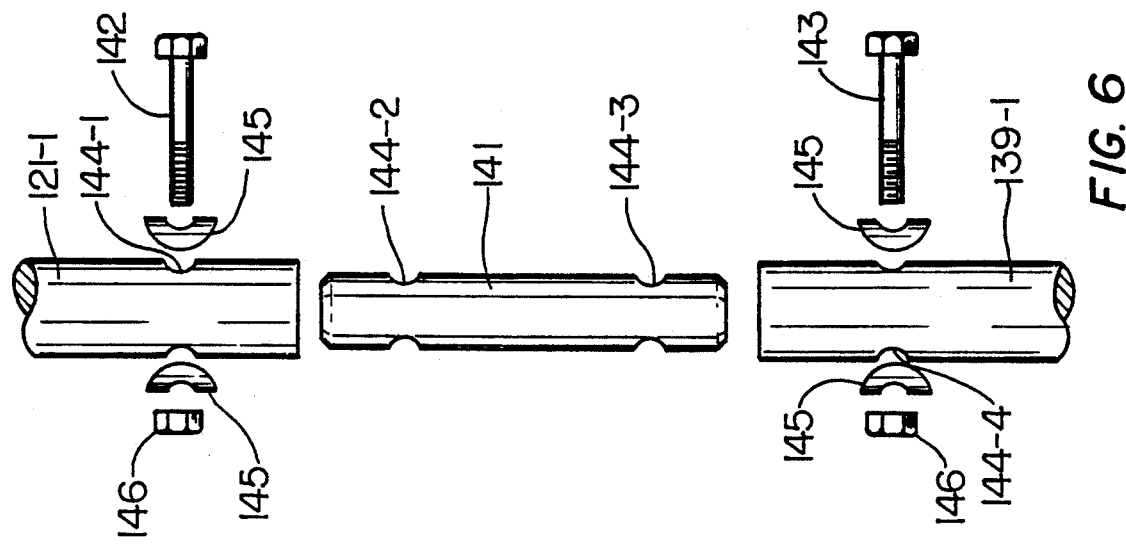
FIG. 6 is an enlarged exploded perspective view showing how adjacent rails are coupled together in end-to-end relationship.
Figure 9:
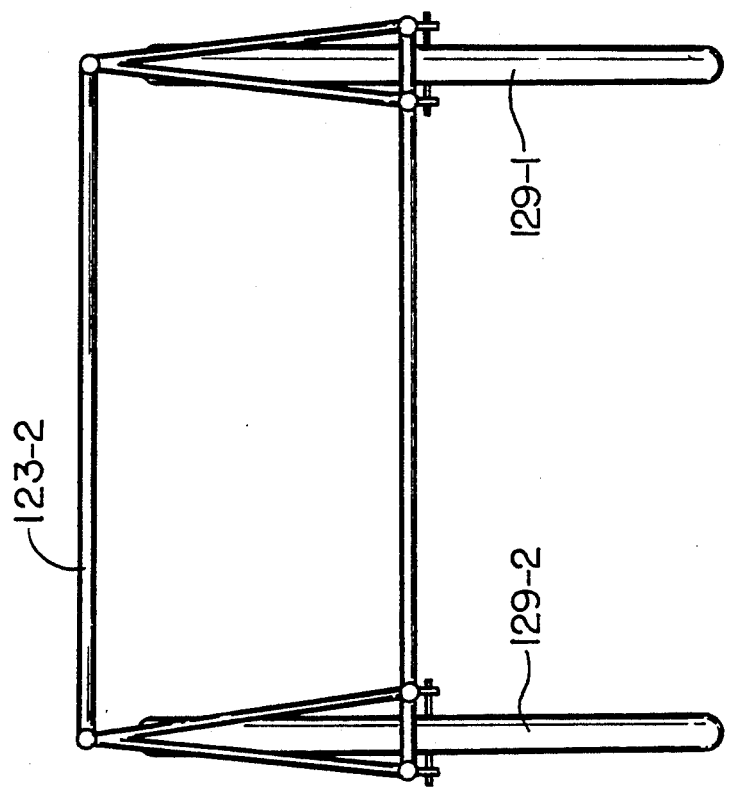
FIG. 9 is a rear view of the trailer module in the trailer assembly shown in FIG. 8.

Extension rail 139-1 is removably attached to upper carriage rails 121-1 by means of a connector tube 141 which is slidably mounted in each rail, a pair of bolts 142 and 143 which extend through suitably located holes 144-1 through 144-4 formed in rails 121-1 and 139-1 and tube 141 and associated washers 145 and nuts 146, see FIG. 6. The other rails in extension section 99 are connected to the other rails in trailer module 101 in a similar manner. The rails in extension section 99 are also removably connected to the rails in front section 97 in a similar manner.

One or more sheets of canvas or other fabric material (not shown) may be attached by snaps or any other known means to the frame of trailer module 101 (and also extension section 99 if so desired) so that relatively small sized items to be transported can be carried therein. Alternatively, a suitably shaped container could be mounted inside trailer module 101 and/or extension 99 or boards placed on the bottom of any or all of these sections.

Trailer module 103 is identical to trailer module 101 and is connected to trailer module 101 in the sameway as extension section 99 is connected to trailer module 101.

As can be appreciated, additional trailer modules can be added, if desired.

Trailer assembly 31 can be removed from hitch assembly 29 by simply removing handle 119, nut 117 and washer 115 and then lifting off sleeve 109.

Figure 7:
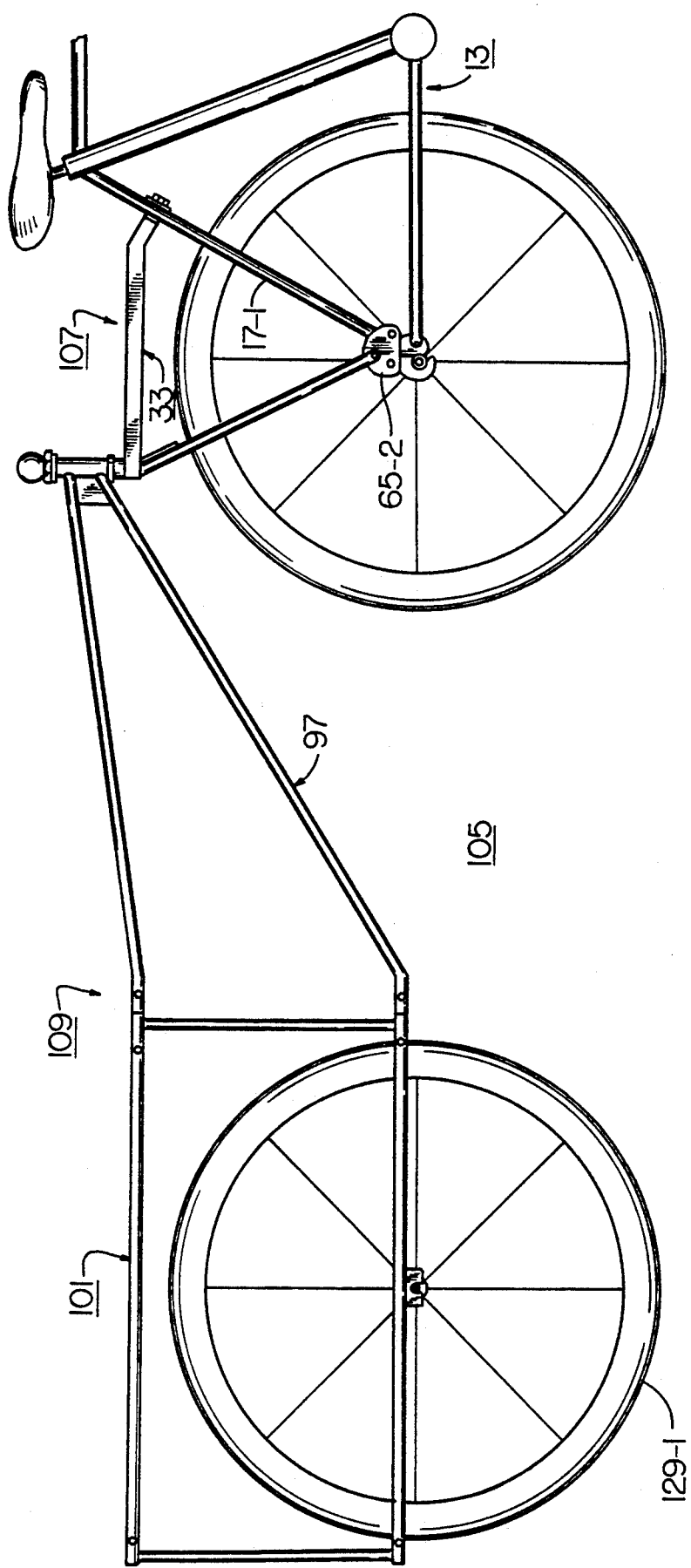
FIG. 7 is a side view of another embodiment of a trailer and hitch apparatus constructed according to this invention, the trailer and hitch apparatus being shown attached to a bicycle.
Figure 8:
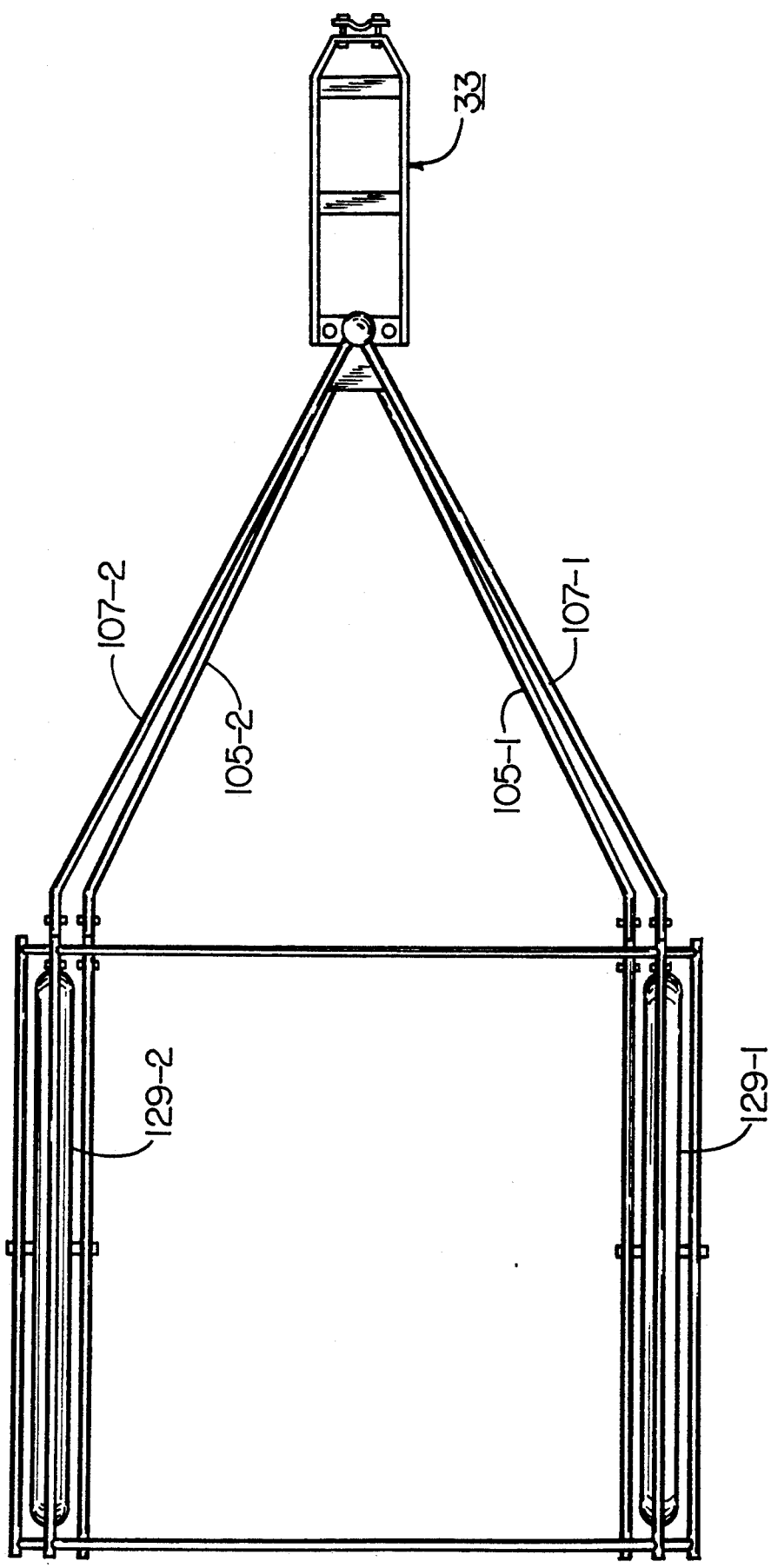
FIG. 8 is a top view of the trailer and hitch apparatus shown in FIG. 7.

In FIGS. 7 and 8 is shown another embodiment of the invention, numbered 105. Apparatus 105 includes a hitch assembly 107 and a trailer assembly 109. Hitch assembly 107 is identical to hitch assembly 29. Trailer assembly 109 differs from trailer assembly 31 in that the extension section 99 and second trailer module 103 have been removed. A back view of trailer module 101 is shown in FIG. 8.

Figure 10:
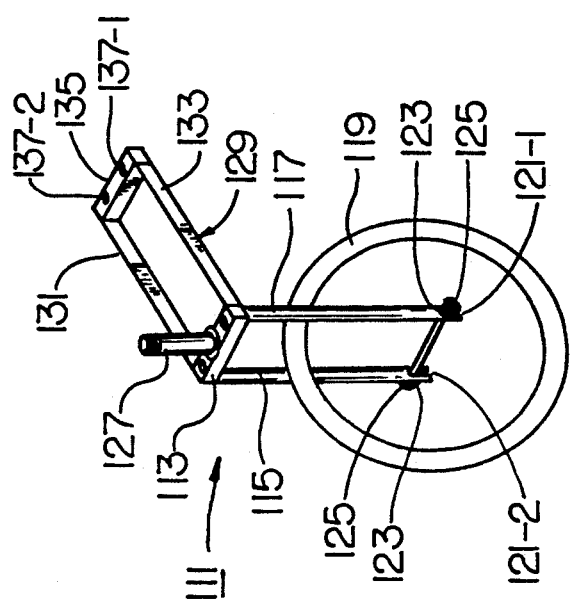
FIG. 10 is a perspective view of an attachment which may be coupled to the trailer assembly in FIG. 1 in place of the bicycle so as to form a cart.

An attachment 111 which may be used with either trailer assembly 31 or trailer assembly 109 to form a utility cart is shown in FIG. 10.

Attachment 111 includes an elongated horizontal rigid sturdy member 113 made of square stock or other suitable material. A pair of wheel support legs 115 and 117 are welded or fixedly attached in any other manner to member 113. A wheel 119 is rotatably mounted in a pair of slots 121-1 and 121-2 formed In legs 115 and 117 and held in place by washers 123 and nuts 125. A vertical pipe 127 of the same cross-sectional size as pipe 77 and threaded at the top as with pipe 77 is welded onto member 113. A horizontal handle 129 is welded onto member 113. Handle 129 includes a pair of arms 131 and 133 and a cross member 135, the cross-member 135 being welded to arms 131 and 133. Cross-member 135 has a pair of holes 137-1 and 137-2 spaced to align with the holes 92-3 and 92-4 in block 44-3.

Figure 11:
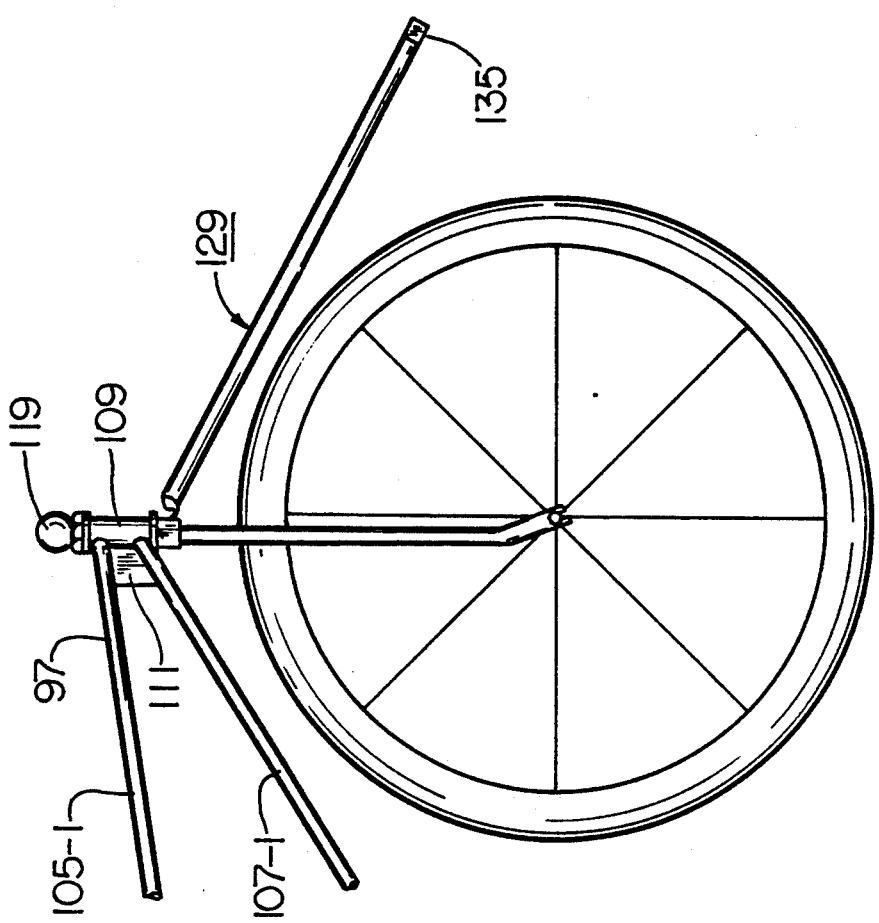
FIG. 11 is a fragmentary side view showing how the attachment of FIG. 10 may be coupled to the trailer assembly in FIG. 1.

Attachment 111 may be attached to front section 97 of trailer assembly 31, as shown in FIG. 11, (or the front section of trailer assembly 109) so as to form a cart with a handle. Also, if desired, cross-member 135 can be attached to block 43 of frame 33 using nuts and bolts (not shown) so as to provide a trailer and hitch apparatus having a trailer assembly which includes attachment 111.

The embodiments of the present Invention recited herein are intended to be merely exemplary and those skilled in the art will be able to make numerous variations and modifications to it without departing from the spirit of the present invention. For example, in another embodiment (not shown), the bicycle trailer includes a cart having a telescoping frame to permit variation of its length. All such variations and modifications are intended to be within the scope of the present invention as defined by the claims appended hereto.

What is claimed is:

1. A trailer and hitch apparatus for a bicycle, the bicycle having a body which includes a rear wheel fork, the rear wheel fork having a top end and a bottom end, a rear wheel rotatably mounted in a slot in a rear wheel mounting plate located at the bottom end of the rear wheel fork, the trailer and hitch apparatus comprising:
 a. a hitch assembly, the hitch assembly comprising,
  i. a horizontal frame having a front end and a rear end,
  ii. a pair of legs mounted on and extending from the rear end of the frame,
  iii. means for attaching the front end of the frame to the rear wheel fork of the bicycle near the top end,
  iv. means for mounting a bottom end of each leg of the pair of legs to the rear wheel fork near the bottom end, and
 b. a trailer assembly, the trailer assembly including,
  i. a first trailer module,
  ii. a front section, the front section having a front end and a rear end,
  iii. means for fixedly connecting the rear end of the front section to the first trailer module, and
 c. means for attaching the front end of the front section to the rear end of the frame for pivotal movement about a horizontal axis and pivotal movement about a vertical axis, said means comprising a pipe, a first sleeve rotatably mounted on said pipe and fixed to said front section, said pipe extending upward, a second sleeve fixedly mounted on the bottom of said upwardly extending pipe at right angles thereto, a horizontal tube rotatably mounted in said second sleeve, a block fixed to each end of said horizontal tube and fixedly attached to said frame.

2. The trailer and hitch apparatus of claim 1 wherein the means for mounting the bottom end of each leg of the hitch assembly to the rear wheel fork comprises a pair of coupling plates, each coupling plate being pivotally attached to one leg and removably attached to one leg of said rear wheel fork.

3. The trailer and hitch apparatus of claim 2 wherein the means for connecting the rear end of the front section to the first trailer module comprises an extension section.

4. The trailer and hitch apparatus of claim 3 further including a second trailer module removably attached to the first trailer module.

5. The trailer and hitch apparatus of claim 3 wherein said first trailer module comprises a frame and a pair of wheels.

6. The trailer and hitch apparatus of claim 3 wherein the first trailer module includes a frame and wheels rotatably mounted inside the frame.

7. The trailer and hitch apparatus of claim 2 and wherein each coupling plate is also removably attached to one of said rear wheel mounting plates.

8. The trailer and hitch apparatus of claim 1 and wherein the front section includes a pair of upper rails and a pair of lower rails all of which are fixedly connected to said first sleeve which is rotatably mounted on said second pipe. rotatably mounted on said pipe.

* * * * *